J. W. LANG.
EGG HANDLING DEVICE.
APPLICATION FILED MAY 18, 1920.
1,374,457.
Patented Apr. 12, 1921.
2 SHEETS—SHEET 1.
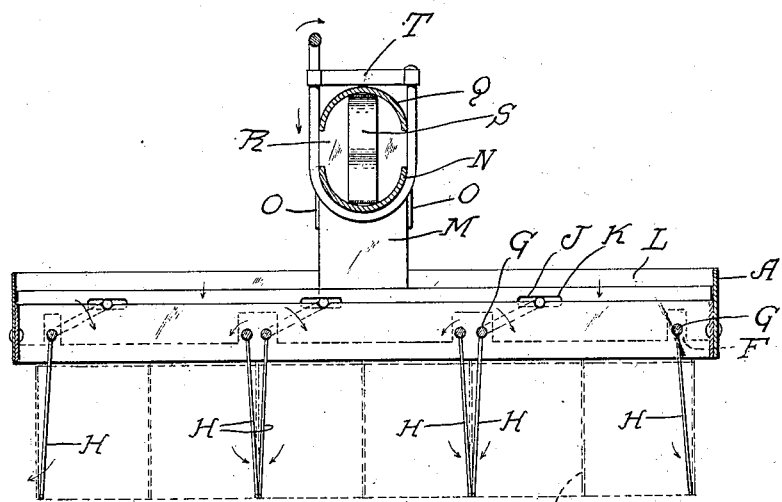
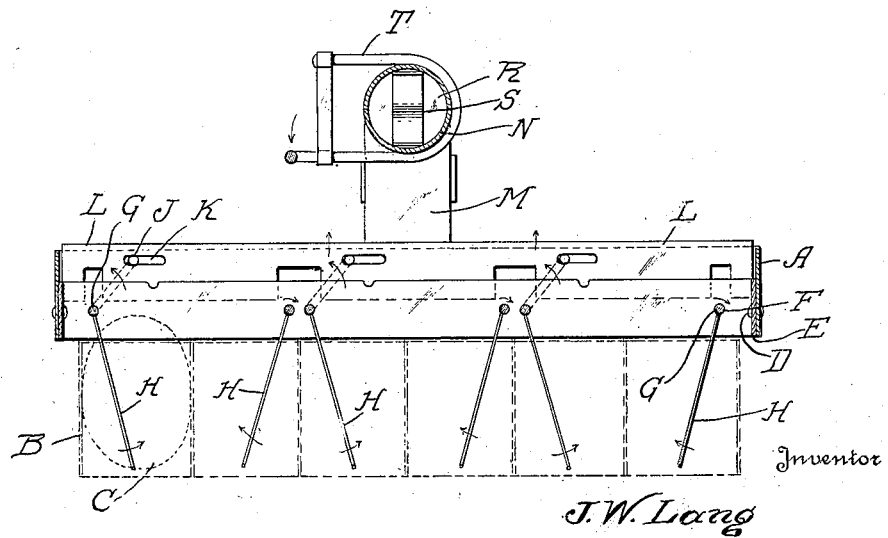

J. W. LANG.
EGG HANDLING DEVICE.
APPLICATION FILED MAY 18, 1920.
1,374,457.
Patented Apr. 12, 1921.
2 SHEETS—SHEET 2.
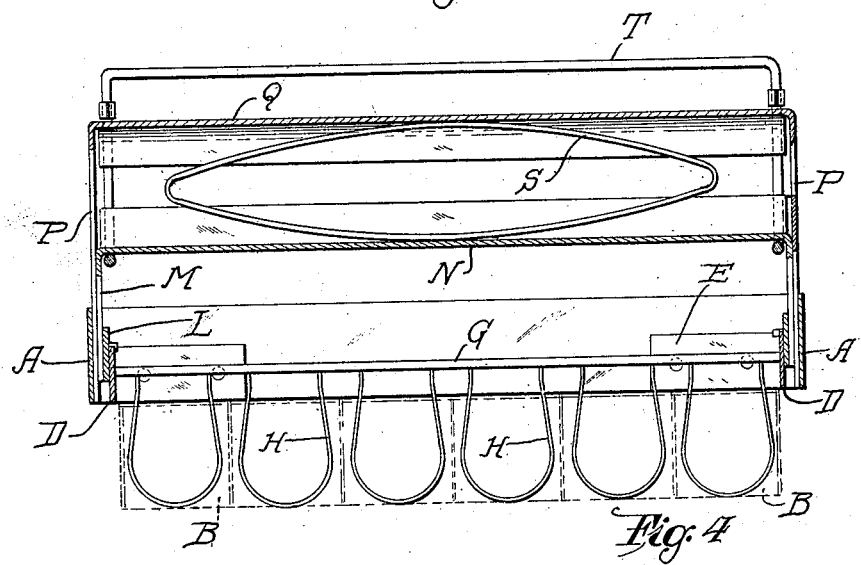
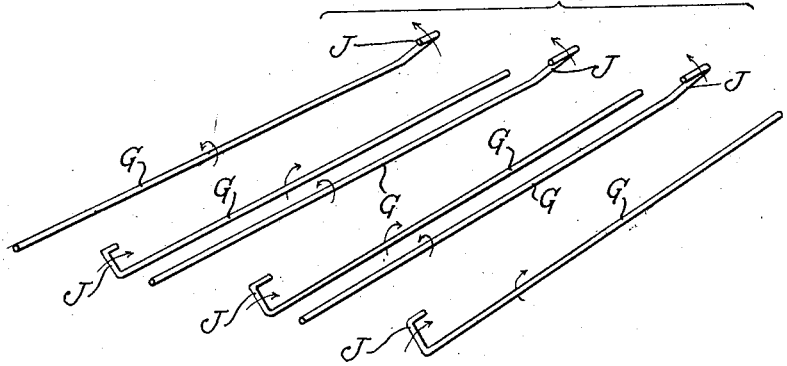
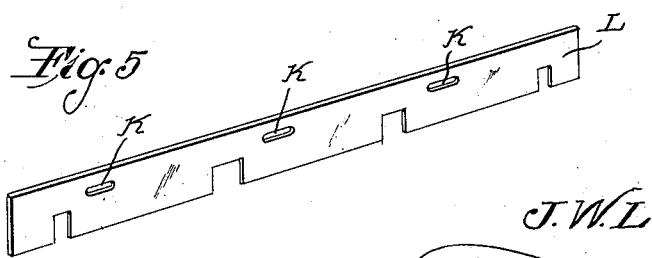
Inventor
J. W. Lang
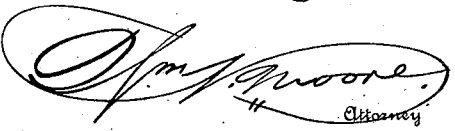

UNITED STATES PATENT OFFICE.

JOSIAH WALLACE LANG, OF FLORIS, IOWA.

EGG-HANDLING DEVICE.

1,374,457.   Specification of Letters Patent.   Patented Apr. 12, 1921.

Application filed May 18, 1920. Serial No. 382,219.

*To all whom it may concern:*

Be it known that I, JOSIAH W. LANG, a citizen of the United States, residing at Floris, in the county of Davis and State of Iowa, have invented certain new and useful Improvements in Egg-Handling Devices, of which the following is a specification.

My invention relates to improvements in egg handling devices and one object of my invention is the provision of a device which will instantly grasp and lift all of the eggs from a layer of cells and deposit them, without risk of breaking any of the eggs, thus insuring rapid and efficient handling of the eggs directly from the crate.

Another object of my invention is the production of a device operated manually to safely lift and deposit a layer of eggs from the crate at a single operation, the device being light in weight, easy of operation, and inexpensive of production to insure a useful, desirable and practical device of this character.

To attain the desired objects my invention consists of a device for handling eggs embodying novel features of construction and combination of parts, substantially as shown, described and particularly defined by the claims.

In order that the detailed construction and operation of my device may be fully understood that its many advantages be appreciated I have shown in the accompanying drawings an egg handling device constructed according to my invention and in said drawings:—

Figure 1 is a vertical central sectional view of the device, the parts being in the position they occupy normally or as inserted in the egg cells, such cells being shown in dotted lines.

Fig. 2 is a similar view showing the parts moved to the position they assume in grasping the eggs in the cells, an egg being shown in dotted lines as grasped.

Fig. 3 is a sectional view at right angles to Figs. 1 and 2.

Fig. 4 is a perspective view of the series of rods which carry the egg grasping loops, and Fig. 5 is a perspective view of one of the vertically movable plates which rock said rod and egg grasping loops.

Referring by letter to the drawings in which the same characters of reference are used to denote like parts in all the views:—

The letter A designates a rectangular metal frame, preferably somewhat larger than the space occupied by a layer of egg cells B, each of a size to contain an egg C.

At two sides of the frame and spaced slightly away therefrom are the pairs of strips D, secured to the frame by angle portions E, said strips being formed with openings F, forming journals for the rods G, each having depending therefrom the series of egg grasping loops H, and the rods being formed each with a bent end J, adapted to engage the slots K, of the pair of plates L.

The plates L have a vertical movement through their connection with the pair of vertical arms M, of the curved cross-piece N, such arms being guided by the ears O, on the depending portions P, of the rigid curved cross-piece Q, said portions P, being rigidly secured at each side to the frame.

The curved cross-pieces N and Q, thus form a container R, for the bow shaped flat spring S, the cross-pieces being normally in the position shown in Fig. 1, and upon grasping and applying hand pressure to said cross-pieces they are brought to the position shown in Fig. 2 which movement also moves the egg grasping loops H, the rods G and plates L, to cause the loops H, to grasp the eggs and permit the lifting and depositing of any or all of the eggs in a series of cells; and when the parts are brought to the position shown in Fig. 2 the loop-shaped latch T, is moved from the position of Fig. 1 to that of Fig. 2, thus locking the parts in proper position to safely and securely hold the eggs, until necessary to move the latch to position of Fig. 1 when the spring S will expand and return all parts to normal position, or as seen in Fig. 1.

The loop-shaped latch is of elongated form, whereby as shown in Fig. 1 its long open space permits opening of the curved cross pieces N and Q, under the action of spring S, while the turning of the said latch T to the horizontal position shown in Fig. 2, brings the said curved cross-pieces N and Q together, and confines them in the said loop-shaped catch.

The device as a whole thus compises a pair of operating handle members, a latch therefor, oscillating rods carrying egg grasping members, and connections between the rods and handle members.

It will thus be understood that the device is placed over one of the compartments of the crate and thus disposes the egg grasping loop in each of the egg cells, and upon compressing the cross pieces the pair of plates are lifted, the rods are rocked and the loops are brought against the eggs, the latch retaining all parts until the eggs have been lifted and deposited, thus insuring a device which will instantly handle the eggs in a rapid manner without risk of breakage of the eggs.

I claim:—

1. A device for handling eggs, consisting of a frame, a series of rods having an oscillating connection with said frame, a series of egg grasping members carried by said rods, and means for oscillating said rods to engage and release the said grasping members consisting of a pair of vertically movable plates, a two part grasping portion for moving said plates, and a locking device to secure said two part grasping portion.

2. A device for handling eggs, consisting of a frame, a series of rods having an oscillating connection with said frame, a series of egg grasping members carried by said rods, and means for oscillating said rods to engage and release the said grasping members, said means consisting of a pair of vertically movable plates connected to work said rods, a two part grasping portion to operate said plates, a spring between said parts of the grasping portion, and a lock to hold the two part grasping portion in the desired position.

3. A device for handling eggs, consisting of a frame, a series of rods rockingly mounted in said frame, egg grasping members carried by said rods, a manually operated connection with said rods for rocking said rods and grasping members, and means for securing said rods and members in normal and operated positions consisting of a two part curved grasping portion, a spring between said parts and a locking bail to hold said parts in open and closed positions.

4. A device for handling eggs, consisting of a frame, a series of rods rockingly mounted in said frame, egg grasping members carried by said rods, a manually operated connection with said rods for rocking said rods and grasping members, and means for securing said rods and members in normal and operated positions, said means consisting of a pair of cross pieces, a spring between said cross-pieces and a latch to hold said cross pieces in adjusted positions, said latch consisting of a bail surrounding said cross-pieces and movable to hold the cross-pieces in closed and open positions.

5. A device for handling eggs, consisting of a rectangular shaped frame, a pair of strips secured in spaced relation to said frame, a series of rods pivoted in said strips and each having a bend at one end, a pair of plates having slots to receive the bent ends of said rods, egg grasping members carried by the rods, a movable handle portion connected to said plates to lift the plates and oscillate the rods and grasping members, a rigid handle member coöperating with said movable handle member, a spring between said members and a latch embracing said handle members, and acting to hold said members and connected parts in adjusting positions.

In testimony whereof I affix my signature.

JOSIAH WALLACE LANG.